United States Patent [19]
Calgari et al.

[11] 4,212,932
[45] Jul. 15, 1980

[54] DEVICE FOR THE DIRECT CONVERSION OF RADIANT ENERGY TO ELECTRICAL ENERGY

[75] Inventors: Seba Calgari; Vittorio Sirtori; Ignazio R. Bellobono, all of Milan, Italy

[73] Assignee: Societa' Nazionale Industria Applicazioni Viscosa s.p.a. (Snia Viscosa), Milan, Italy

[21] Appl. No.: 14,156

[22] Filed: Feb. 22, 1979

[30] Foreign Application Priority Data

Feb. 28, 1978 [IT] Italy ............................... 20678 A/78
Nov. 24, 1978 [IT] Italy ............................... 30173 A/78

[51] Int. Cl.$^2$ ..................... H01M 6/30; H01M 6/36
[52] U.S. Cl. ............................. 429/111; 136/89 NB; 250/211 J; 250/212; 357/8; 357/30
[58] Field of Search ............... 429/111; 136/89 NB; 250/211 R, 211 J, 212; 357/8, 30; 358/902; 350/354

[56] References Cited

U.S. PATENT DOCUMENTS

| 3,584,934 | 6/1971 | French | 350/353 |
| 3,972,733 | 8/1976 | Kamei et al. | 136/89 |
| 4,152,490 | 5/1979 | Witzke | 429/111 |

*Primary Examiner*—Aaron Weisstuch
*Attorney, Agent, or Firm*—Wenderoth, Lind & Ponack

[57] ABSTRACT

A cell for the direct conversion of radiant energy to electrical energy for carrying the process is characterized in that it comprises two layer-like zones each comprising a transparent material and at least one photochromic compound, electrical conduction means between said two zones, and two electrodes. The two layer-like zones may be constituted by different portions of a same layer. The photochromic compounds used are preferably spiro-2H-pyranes and the electrodes are metals having a standard oxidation potential higher than—2.5V or their oxides or photoactive semi-conductors.

22 Claims, 3 Drawing Figures

DEVICE FOR THE DIRECT CONVERSION OF RADIANT ENERGY TO ELECTRICAL ENERGY

BACKGROUND OF THE INVENTION

This invention refers to a process for the direct conversion of radiant energy to electrical energy by means of photochromic systems and to a device for carrying out the process.

The photochromic systems according to the invention are based on the use of photochromic compounds which can undergo reversible heterolytic photochemical splitting (photochemical heterolysis), which are incorporated in suitable transparent materials.

Although the photovoltaic effect has been known for over a century, only from the fifties of this century thought has been given to exploiting it for practical purposes by the use of photocells based on inorganic semi-conductors. Still more recently it has been proposed to use organic semi-conductors or photoelectrochemical systems (M. D. Archer "Photochemistry" Vol. 6, Spec. Per. Rep., The Chemical Society, London (1975), pages 739-764; Vol. 7 (1976) pages 561-584).

SUMMARY OF THE INVENTION

The process according to the invention is characterized in that at least one layer of transparent material containing at least one photochromic compound capable of attaining a stationary condition of its photochemical dynamics under photonic radiation, is subjected to photonic radiation and is connected with electrodes between which a flow of current is established, whereby energy is produced.

Said layer or layers are preferably thin layers in the form of viscous liquids or membranes. The radiation is preferably due to exposure to sunlight. Even when there is only one layer, two terminal zones may be ideally distinguished therein which are subject to differential irradiation inasmuch as the sunlight firstly strikes one face of the layer and then passes through the thickness thereof, whereby its intensity is decreased before reaching the other face.

The density of the photochromic compound or compounds need not be the same in the two zones and at the limit it could be zero in one of them. The thickness of the layer preferably varies in the case of membranes from 1 to 250 microns and in the case of liquid layers from 10 microns to a few millimeter, preferably not significantly more than one millimeters.

Photochromic compounds among the most suitable are e.g. those belonging to the chemical class of the spiro-2H-pyranes.

A photo-current proportional to the radiant flux absorbed by the layer containing the photochromic substance is produced because of the stationary state of the molecules of the photochromic compund originally introduced into the transparent material and the products of their heterolytic decomposition.

The device according to the invention comprises as its fundamental element or cell—it being possible to associate any desired number of elements or cells to obtain any desired power—two layer-like zones comprising a transparent material and the aforesaid photochromic compound or compounds, electrical conduction means between said zones, and two electrodes.

Possibly and even preferably the two aforesaid zones are not physically separated and are constituted by different portions of a same layer, the one facing the direction from which radiation originates and the other disposed behind the first so as to receive only the radiation which has not been absorbed by said first portion. In practice the distinction between the two zones is not sharp and it would not be possible to trace an ideal separation surface.

It is desirable to employ as transparent materials, substances having low absorption in the spectral range wherein the photochromic effect of the photochromic compounds employed is significant and wherein it is intended to exploit the photochromic effect.

The electric conduction means may advantageously comprise conductive layers. When the two layer-like zones are constituted by different portions of the same layer, the conductive means may be incorporated therein, so that the conductive layer coincides with the layer containing the photochromic substance. Mechanical support layers, conductive or not, and other conductive means, such as conductive wires and the like, conventional per se, may be employed to lead the current to any desired destination.

According to a preferred form of the invention, the zones or layers containing the photochromic compounds also contain one or more sensitizers capable of rapidly stabilizing the photochemical dynamics of said compounds.

Said sensitizer may advantageously be constituted by the product of the heterolytic splitting of the same photochromic compound or of other compounds of the same class. The sensitizer may also be generated in situ by adding to the layer, together with the photochromic substance, a photosensitive substance in amounts preferably from 0.01 to 0.5 mols per mol of photochromic compound, which photosensitive substance is capable of partially stabilizing the open form of the photochromic compound.

The choice of the transparent material wherein the reactive photochromic substance is introduced, is of primary importance in carrying out the process. While on the one hand an essential requisite is that the photochemical reaction occur with quantum yields which are as close as possible to unity in a wide range of wavelengths, on the other hand, the flow of current should meet with the least possible resistance within the transparent material.

Suitable photochemical compounds for carrying out the invention may be preferably spiro-[2,2'-indoline-2H-aropyranes], spiro-[2,2'-benzothiazoline-2H-aropyranes] or spiro-[pyrano-pyranes] or others characterized by the spiro-2H-pyrano group, such as spiro[2H-1-benzopyran-2,2'-indolines]; spiro-indolinenaphthopyranes, spiro[2H-1 benzopyran-2,2'-benzothiazolines].

BRIEF DESCRIPTION OF THE DRAWINGS

The invention will be better understood with reference to the appended drawings, wherein.

DESCRIPTION OF THE PREFERRED EMBODIMENTS

Figure 1:
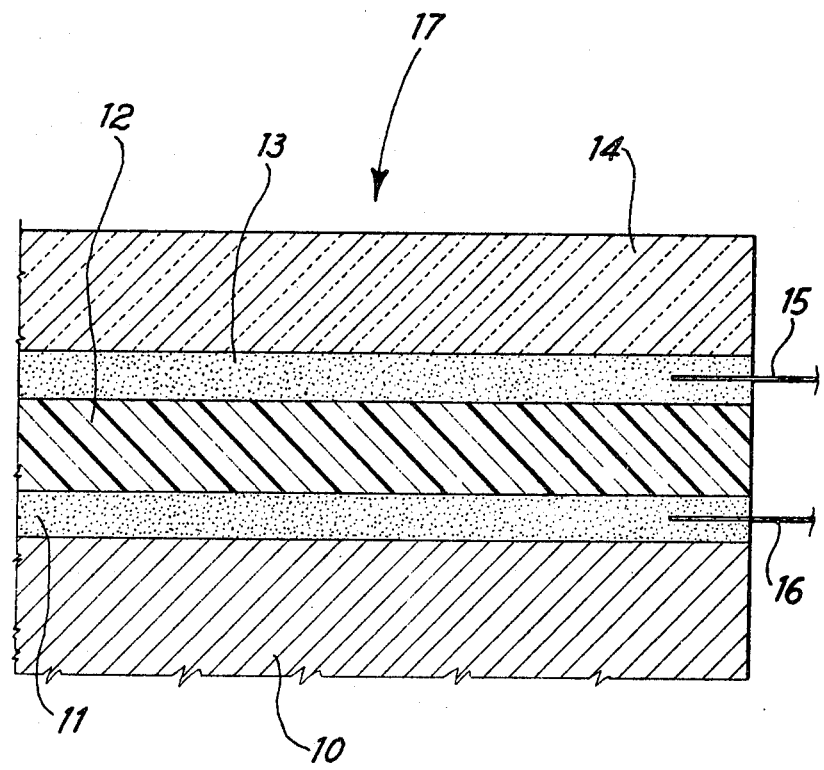
FIGS. 1, 2 and 3 are all schematic cross-sections of elements or cells according to embodiments of the invention, taken on planes parallel to the direction of the radiation, which elements permit conversion of photochemical energy having wavelengths greater than 300 nm (which is characteristic of sunlight at ground level) into electrochemical energy.

According to one preferred embodiment of a device according to the invention, illustrated in FIG. 1, a membrane is provided having a thickness preferably from 1 to 250 microns, on a base of an organic polymer, preferably a transparent polymer which can be worked into thin sheets such as e.g. diacetylcellulose, triacetylcellulose, polyacrylonitrile, polyesters, etc. One or more photochromic compounds which can undergo reversible heterolytic (photochemical) splitting, are incorporated in the membrane in the course of its preparation, in amounts from 0.1% to 25% by weight thereof.

It may be found advantageous to add to said compounds, photochemical substances capable of promoting the photochemical dynamics by generating, by photochemical reaction, a product which can partially stabilize the open form of the photochromic compound, in amounts from 0.01 to 0.5 mol per mol of photochromic compound. Halogenated compounds wherein one or more halogen atoms are photolabile are generally used for this purpose.

Suitable metals for the electrodes are metals having a standard oxidation-reduction potential higher than $-2.5$ V. Preferably metals the oxides which have the properties of photoactive semi-conductors are used. The oxides themselves or other photoactive semi-conductors may be used to constitute one of the electrodes or both of them.

As seen in FIG. 1, numeral 10 indicates a support port body or layer, which may consist of a conductive metal, e.g. aluminum, or may be of a transparent material in the case when a plurality of elements or cells are to be superimposed. Since the geometry of the cell may be considerably varied, only the part of said body adjacent to the other layers which make up the cell is shown in the figure, and it is to be noted that said body may have a much greater thickness than the other layers and in any event is not a critical component.

Above body 10 a layer 11 is disposed of a nonmetallic conductive material, e.g. a gel which has been rendered conductive. Above layer 11 there is a layer 12 which contains the photochromic substance or substances incorporated in a transparent material. Above the same, there is a layer 13 substantially equal to the layer 11 or at any rate constituted by a like material, and above it there is a layer 14 of a transparent and inert material, e.g. glass. The thickness of the layer 12 adjacent to the layer 11 constitutes one of the two ideal photochromic layer-like zones, and the position adjacent to the layer 13 constitutes the second ideal photochromic layer-like zone. The two conductive layers 11 and 13 are connected to the electrodes constituted by conductive wires 15 and 16, wherein the conductive wire 15 may also be connected to the support layer 10 if this is conductive. The radiation originates from the direction indicated by the arrow 17.

Suitable materials for constituting the conductive layers 11 and 13 are the viscous liquid mixtures or masses constituted by one or more polar solvents (e.g. water, glycols) containing an ionizable salt (e.g. sodium or potassium halides) and or a polyelectrolyte (e.g. the sodium salt of carboxymethylcellulose, of polyacrylic acid, etc.) and further an inert compound having the function of a thickener of the mixture. The polyelectrolyte may also serve by itself as the mixture thickener.

FIG. 1 may be interpreted as a cross-section through a series of superimposed plane layers or a cross-section through the wall of a body having a curved, particularly a cylindrical shape, such as e.g. a multilayer hollow fibre, layer 10 being in such a case missing or constituted by a material filling the inner cavity of the fibre. Generally speaking, the layers shown in the figure—and the same is true of FIGS. 2 and 3 hereinafter described and in general of any embodiment of the invention—may be bent into any desired configuration and have any desired geometry.

A plurality of such cells, having any suitable dimensions, may be connected to constitute an energy generator which converts the photonic energy of the radiation to electrical energy.

Obviously the cell is disposed in such a way that the radiation strikes the layer 14 and penetrates through it and through the conductive layer 13 into the layer 12. Under these conditions the radiation is much more intense on the face of the layer 12 adjacent to layer 13 (upper face) than on that adjacent to layer 11 (lower face). Layer 12 may therefore be considered as ideally divided into two zones exposed to different irradiation and consequently having different photonic absorption.

Of course one could physically separate the two layer-like zones and therefore layer 12 could become two layers, but this would have no advantages and would involve practical difficulties. Likewise the density of the photochromic substance could be different in the various points of layer 12 and e.g. could decrease from the outside to the inside to the point of becoming zero: but this too is not easy to effect and would not offer adequate advantages.

As it is known, two yields must be considered in devices of this kind, the quantum or photonic yield and the power yield, the first of which expresses the percentage of photonic energy transformed and the second the percentage of power furnished with respect to the power available in the form of photonic radiation. The quantum yields in cells according to the invention reach surprisingly high values, as will appear from the examples, even higher than 60%, in the wavelength range of complete absorption, while the power yields may attain the order of 10% or more. Such yields are practically without comparison in photoelectrochemical devices for the direct conversion of photonic to electrical energy, particularly with respect to the power yield.

A photocell of the type described, exposed to a source of radiation having a spectrum distribution comprised within the limits of the radiation of the sun at sea level, is capable of furnishing a current in the order of some microamperes per sq. cm.

Figure 2:
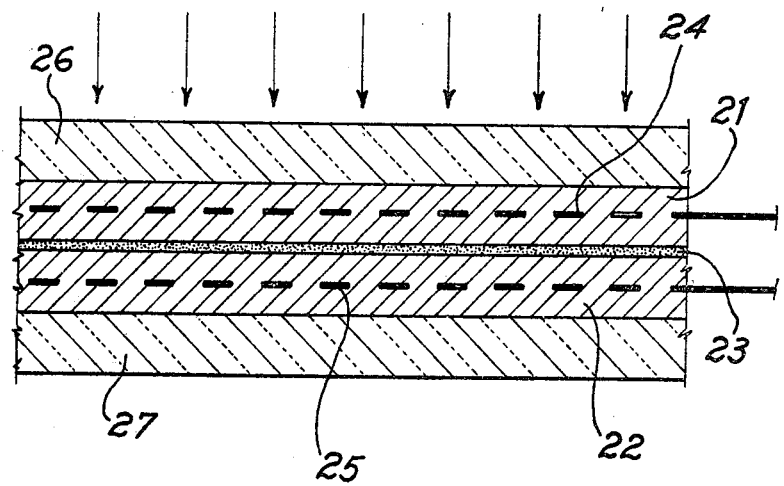

FIG. 2 illustrates another embodiment of the invention schematically constituted by an element or cell which comprises two electrodes; two layers of a material, e.g. a polymeric transparent material, containing at least one photochromic substance; and an intermediate conductive, e.g. electrolytic layer for establishing the contact between the two aforesaid layers containing the photochromic substance. As will better appear later with reference to FIG. 3, the aforesaid layers could merge into one electrolytically conductive layer containing the photochromic substance.

Conveniently, the two electrodes may be immersed in the two layers containing the photochromic substance; and the device may be provided with two outer transparent e.g. polymeric layers. In multi-cell devices, however, these latter may be desirably omitted whenever possible.

In the figure, numerals 21 and 22 indicate two layers of a polymeric transparent material containing the photochromic substance. Numeral 23 indicates the intermediate conductive layer. Numerals 24 and 25 indicate the two electrodes which in this case are constituted by two metal wire screens. One of the wire screens could be substituted by a thin metal sheet when opaqueness is permissible, e.g. in the inner electrode of a hollow fibre. Numerals 26 and 27 indicate two outer transparent protective layers, which in some cases can be omitted. The arrows indicate the direction of the radiation.

Figure 3:
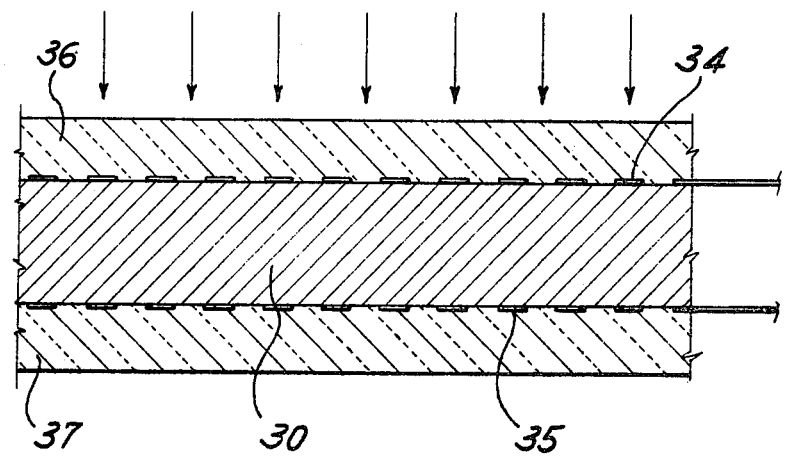

FIG. 3 illustrates still another embodiment. Herein numerals 34 and 35 indicate two electrodes constituted by metals or oxides or in general semiconductors, again illustrated in net or mesh form though this is not critical as hereinbefore said. The two electrodes are placed at the two faces of a single conductive layer 30 containing the photochromic compound, viz. a transparent material which may be like layer 11 of the embodiment of FIG. 1 or layer 23 of the embodiment of FIG. 2 into which the photochromic compound has been incorporated. Two outer transparent layers 36 and 37 are provided in the case illustrated. The position of the electrodes on the boundaries of the layer or layers containing the photochromic substance is generally a preferable one and could conveniently be adopted in the embodiment of FIG. 2 as well.

It has been found that a device according to the invention, has a surprising and unexpected behavior, which will now be described without attempting to give any scientific explanation of the phenomena which occur, since they are still being investigated for the purpose of attaining reliable interpretation.

The assembly constituted as described, when it is not subjected to photonic irradiation, develops a limited potential difference and consequently is adapted to the production of limited amounts of energy by conversion of chemical into electrochemical energy. It behaves therefore like a chemical battery cell and at least partially irreversible chemical transformations occur therein which produce the aforesaid limited amounts of energy.

When the device is exposed to photonic irradiation, the power produced rapidly increases to a very substantial extent e.g. from $2 \times 10^{-2}$ mW/sq.cm. to 6 mW/sq.cm. and therefore an evident direct transformation of photonic into electric energy occurs. This may be brought about e.g. by exposing the device to the sunlight. When the photonic irradiation ceases or decreases to a very low level, the difference of potential and the power which the device can produce do not go back to the values which they had before irradiation but remain higher and decrease with the passing of time and only at the limit, after several hours, e.g. 6-8 hours, have passed, return close to their initial values. It is therefore clear that a part of the photonic energy received by the device is stored and not immediately transformed and is available for a transformation protracted in time.

As to the mechanism through which said surprising accumulation and subsequent transformation phenomena occur, the Applicant does not wish to be bound to any theoretical explanation.

Considering that the discharge time of the device after it has ceased being exposed to irradiation amounts to several hours, it is clear that in this way a battery-accumulator device has been created which can become charged during the daytime and discharged during the night hours, whereby to deliver an amount of energy which will not be constant but will be significant over the twenty-four hours of the day, and therefore the device can be regarded as an energy producing unit fed by photonic energy and with a practically constant or at least continuous delivery.

It is evident that this is a surprising progress in the art of energy production, in particular from solar radiation.

A number of specific examples will now be described, Examples 1-3 referring to the embodiment of FIG. 1, Examples 4-6 to that of FIG. 2, and Examples 7-9 to that of FIG. 3.

EXAMPLE 1

0.9% of 6MeO-8NO$_2$-BIPS, 0.9% of 6OH-BIPS, 0,17% of tribromo-ethanol, 5% of LiCl have been incorporated into a cellulose acetate membrane having a thickness of 60 microns. The term BIPS is an abbreviation meaning 1',3',3'-trimethylspiro-[2H-1-benzopyran-2,2'-nidoline]. Two conductive layers of gel, the composition of which is 40% water, 20% KCl, 20% carboxymethylcellulose are disposed on the two faces of the membrane. Two copper wires are placed in contact with the gelation and the whole is encapsulated between two thin glass plates. The membrane is irradiated with a halogen lamp, with a power of 10 mW/sq.cm.

When stationary conditions have been reached within 15-30 minutes from the start of the irradiation, the open circuit difference of potential is about 30 mV. The short circuit current is 0.13-0.14 $\mu$A/sq.cm. (microamperes per sq.cm.) (Inner resistance of the membrane is about 20000 Ohm).

The average quantum yield (value integrated with respect to all the spectrum wavelengths) is 5.1%.

EXAMPLE 2

A cell having two compartments separated by a membrane of the same composition as that of Example 1 is used.

In the two compartments a 0.6 molar KCl solution and two silver wire electrodes are introduced. The irradiation (10 mW/sq.cm.) is begun as in Example 1 and when stationary conditions are reached, the open circuit difference of potential is about 35 mV, the short circuit current is about 0.15 $\mu$A/sq.cm.. The average quantum yield is 4.9%.

EXAMPLE 3

A photoelectrochemical cell is used having the following structure: on a 12 micron thick aluminum sheet a thin layer of a conductive gel (constituted by 30 parts of diethylene glycol, 30 parts of H$_2$O, 15 parts of potassium chloride, 15 parts of carboxymethylcellulose) is spread, and a membrane equal to that of Example 1 is laid in contact with said layer.

A second layer of conductive gel is laid on the face to be exposed to the radiation and a small copper wire brush is placed in contact therewith.

The whole is encapsulated in glass plates. The membrane is then irradiated by means of a halogen lamp with an intensity of 10 mW/sq.cm. The short circuit tension rises to 0.45 V. The current due to the illumination becomes stabilized at 2.5 $\mu$Amperes/sq.cm. The quantum yield (integrated over all the wavelengths between 350 and 550 nm) is 63%. The power yield (in the indicated range) is 1.01%. The overall energy yield is about 0.1%.

EXAMPLE 4

An electrolyte of the composition 50% $H_2O$; 33% diethylene glycol, 10% carboxymethylcellulose, 7% KCl is placed between two 50 micron thick membranes containing $3 \times 10^{-2}$ m of 6OH-1',3',3' trimethyl-spiro-[2H-1-benzopyran-2,2'-indoline], $3 \times 10^{-2}$ m of 6MeO-8NO$_2$-1',3',3'-trimethyl-spiro[2H-1-benzopyran-2,2'-indoline], $(1.2)10^{-2}$ m of tribromoethanol and 0.7 m of LiCl ("m" means molar concentration).

The two membranes are hermetically sealed to one another, to enclose a layer of electrolyte having a thickness of about 1 mm). A net or mesh of Cu on the radiation side and a net or mesh of Al on the other side are placed in contact with the outer faces of the two membranes, said wire screens having 49 meshes per sq.cm., whereafter the cell is hermetically sealed between two methyl methacrylate plates. When the copper electrode is subjected to solar radiation (nominal photonic flux about 80 mW/sq.cm.) the cell delivers a power of $5.3 \times 10^{-2}$ mW/sq.cm.. The power decreases to $2 \times 10^{-2}$ mW/sq.cm. during the night. The average of the overall energy yield, taking the sunlight/darkness cycle into account, is close to 0.1%.

EXAMPLE 5

An electrolyte having the composition 50% $H_2O$, 33% diethylene glycol, 10% carboxymethylcellulose, 7% KCl, is placed between two 50 micron membranes of 2,4-acetylcellulose containing LiCl in molar concentration of 0.7. The two membranes are hermetically sealed to one another, whereafter a surface layer of the order of 0.1 micron containing 1,3,3-trimethyl-spiro-[indoline-2,3'-[3H]-naphtho[2,1-b]pyran] is laid onto the outer faces. A Cu wire screen on the irradiation side and an Al net or mesh on the other, having 49 meshes per sq.cm., are placed in contact with the outer faces of the two membranes, whereafter the cell is hermetically closed between two methyl methacrylate plates. When the copper electrode is subjected to solar radiation (nominal photonic flux 80 mW/sq.cm.) the cell delivers a power of $8 \times 10^{-2}$ mW/sq.cm. The power decreases to $3 \times 10^{-2}$ mW/sq.cm. during the night.

The main global energy yield, taking into account the sunlight/darkness cycle, is close to 0.15%.

EXAMPLE 6

An electrolyte of the composition Agar-agar 10%, $H_2O$ 70%, KCl 20%, is placed between two 50 micron membranes of 2,4-acetylcellulose containing in molar concentrations $3 \times 10^{-2}$ m of 1,3,3-trimethyl-spiro[indoline-2,3'-[3H]-naphtho[2,1-b]pyran], $0.6 \times 10^{-2}$ m of tribromethanol and 0.7 m of LiCl. The two membranes are hermetically sealed to one another. A Cu wire screen on the radiation side and an Al screen on the other, having 49 meshes per sq.cm., are placed in contact with the outer faces of the two membranes, whereafter the cell is hermetically closed between two methyl methacrylate plates. When the copper electrode is subjected to solar radiation (nominal photonic flux 80 mW/sq.cm.) the cell delivers a power of $6.4 \times 10^{-2}$ mW/sq.cm.

The power decreases to $2.6 \times 10^{-2}$ mW/sq.cm. during the night.

The average global energy yield, taking into account the sunlight/darkness cycle, is about 0.14%.

EXAMPLE 7

Two electrodes the first constituted by a copper wire screen having 49 meshes per sq.cm. and the second by an anodized aluminum sheet are superimposed and maintained at a fixed mutual distance of 1 mm by means of a frame of a suitable polymeric material, e.g. a polyacrylic resin. Between the two an electrolyte is placed consisting of KCl 7%, diethylene glycol 33%, water 50%, carboxymethylcellulose sodium salt 10%, 6-OH-1',3',3'-trimethyl-spiro-[2H-1-benzopyran-2,2'-indoline] $2 \times 10^{-4}$ m, 6-MeO,8-NO$_2$,1',3',3'-trimethyl-spiro-[2H-1-benzopyran-2,2'-indoline] $2 \times 10^{-4}$ m.

When the copper electrode is subjected to solar radiation (nominal photonic flux 80 mW/sq.cm.) the cell delivers a power of 1.5 mW/sq.cm.. The power decreases to 0.5 mW/sq.cm. during the night. The average global energy yield, taking into account the sunlight/darkness cycle, is about 2.4%.

The same cell without the addition of the photochromic compounds in the electrolyte, delivers under identical conditions a power of 0.56 mW/sq.cm. The power decreases to 0.23 mW/sq.cm. during the night, with an average global energy yield of 1.1%.

EXAMPLE 8

Example 7 is repeated, with the only difference that the anodized aluminum electrode is substituted with a zinc electrode.

The power delivered under a nominal photonic flux of 80 mW/sq.cm. is 1.3 mW/sq.cm. During the night the power is 0.46 mW/sq.cm.. The average global energy yield is about 2.4%.

EXAMPLE 9

Example 7 is repeated, with the only difference that the anodized aluminum electrode is substituted with a $TiO_2$ electrode.

The power delivered under a nominal photonic flux of 80 mW/sq.cm. is $2.2 \times 10^{-3}$ mW/sq.cm.

In all the examples the percentages and parts are by weight. When one and only one electrode is copper, this functions as the cathode. The "global energy yield" is defined as the ratio between the maximum power output ($W/cm^2$) of the photoelectrochemical cell and the radiance ($W/cm^2$).

We claim:

1. Cell for the direct conversion of radiant energy to electrical energy, which comprises two layer-like zones each comprising a transparent material and at least one photochromic compound which is a spiro-2H-pyrane, electrical conduction means between said two zones, and two electrodes.

2. Cell according to claim 1, wherein the two layer-like zones are constituted by different portions of the same layer.

3. Cell according to claim 2, wherein electrolytic conductive means are incorporated in the layer comprising the photochromic compound, whereby said layer coincides with the conductive layer.

4. Cell according to claim 2, wherein the layers comprising the at least one photochromic compound are liquid layers having a thickness from 10 microns to 10 millimeters.

5. Cell according to claim 2, wherein the layers comprising the at least one photochromic compound are polymeric membranes having thicknesses from 1 to 250 microns.

6. Cell according to claim 2, wherein the layers have a curved configuration.

7. Cell according to claim 6, wherein the layers are embodied in hollow fibres.

8. Cell according to claim 1, wherein the transparent material is a material having low absorption in the spectral range in which the photochromic effect of the photochromic compounds employed is significant.

9. Cell according to claim 1, wherein the electrical conduction means comprise at least one conductive layer.

10. Cell according to claim 9, wherein the conductive layer comprises at least one ionizable salt in solution in at least one polar solvent.

11. Cell according to claim 9, wherein the conductive layer has a liquid base containing at least a thickener.

12. Cell according to claim 1, wherein the layer-like zones comprising the at least one photochromic compound also contain at least one sensitizer substance capable of rapidly stabilizing the photochemical dynamics of the photochromic compounds.

13. Cell according to claim 1, wherein the transparent material has a low electrical resistance.

14. Cell according to claim 1, characterized in that it is bounded at least on one face by a layer of transparent inert material.

15. Cell according to claim 1, wherein it comprises two electrodes and a layer interposed therebetween, said layer comprising a transparent viscous liquid material, at least one photochromic compound, and an electrolyte.

16. Cell according to claim 1, wherein the electrodes comprise an active material chosen from the class consisting of metals having a standard oxidation-reduction potential higher than $-2.5$ V and oxides of said metals.

17. Cell according to claim 1, wherein at least one of the electrodes comprises a photoactive semi-conductor.

18. Cell according to claim 17, wherein the photoactive semi-conductor is a metal oxide.

19. Cell according to claim 1, wherein at least one of the electrodes comprises as active material a metal, the oxide of which has the properties of a photoactive semi-conductor.

20. Cell according to claim 1, wherein the electrical conduction means comprise at least one polyelectrolyte.

21. Device for the conversion of radiant to electrical energy, which it comprises a plurality of cells according to claim 1, in mutual association.

22. Cell according to claim 1, wherein the spiro-2H-pyrane compounds are selected from the group consisting of spiro-[2,2'-benzothiazoline-2H-aropyranes], spiro-pyranopyranes, spiro[2H-1-benzopyrane-2,2'indolines], spiro-indolinenaphthopyrane and spiro-[2H-1 benzopyrane-2,2'-benzothiazoline].

* * * * *